March 13, 1945.   F. B. LEVETUS ET AL   2,371,528
PRESSURE FLUID CONNECTIONS BETWEEN RELATIVELY ROTARY PARTS
Filed Sept. 13, 1943   2 Sheets-Sheet 1
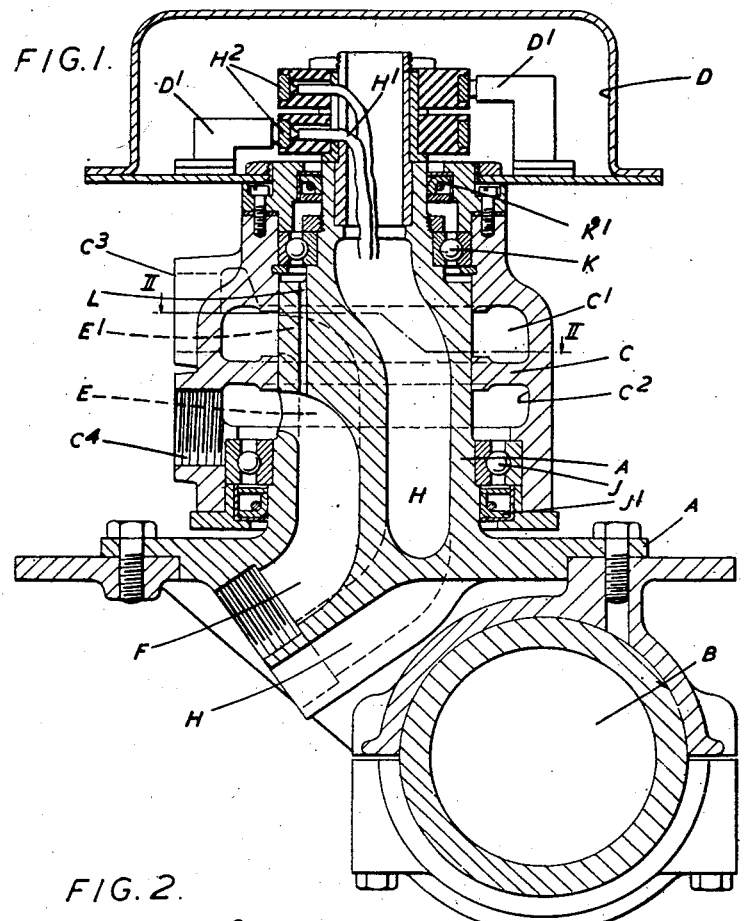
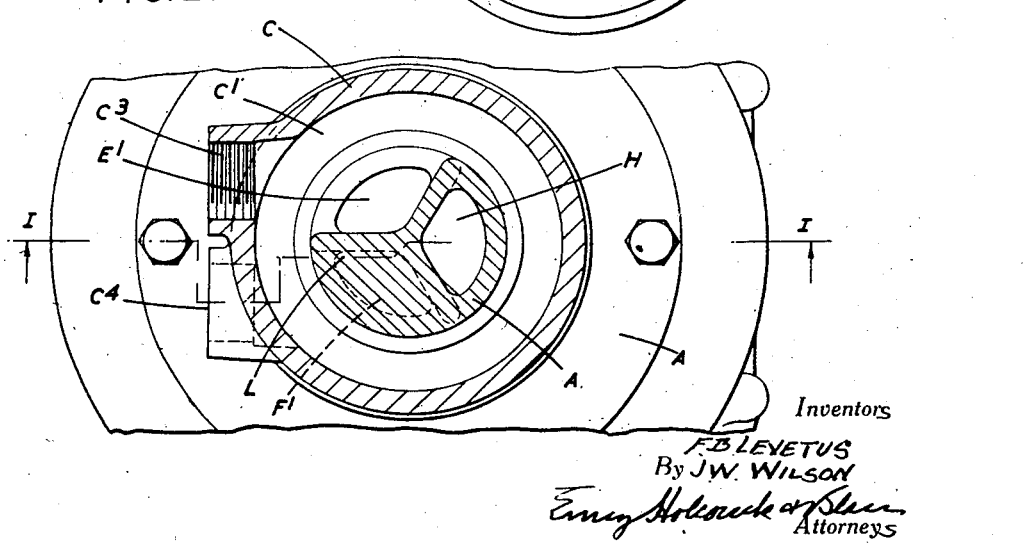
Inventors
F. B. LEVETUS
By J. W. WILSON
Emery Holcombe & Sloan
Attorneys March 13, 1945.　　F. B. LEVETUS ET AL　　2,371,528
PRESSURE FLUID CONNECTIONS BETWEEN RELATIVELY ROTARY PARTS
Filed Sept. 13, 1943　　2 Sheets-Sheet 2
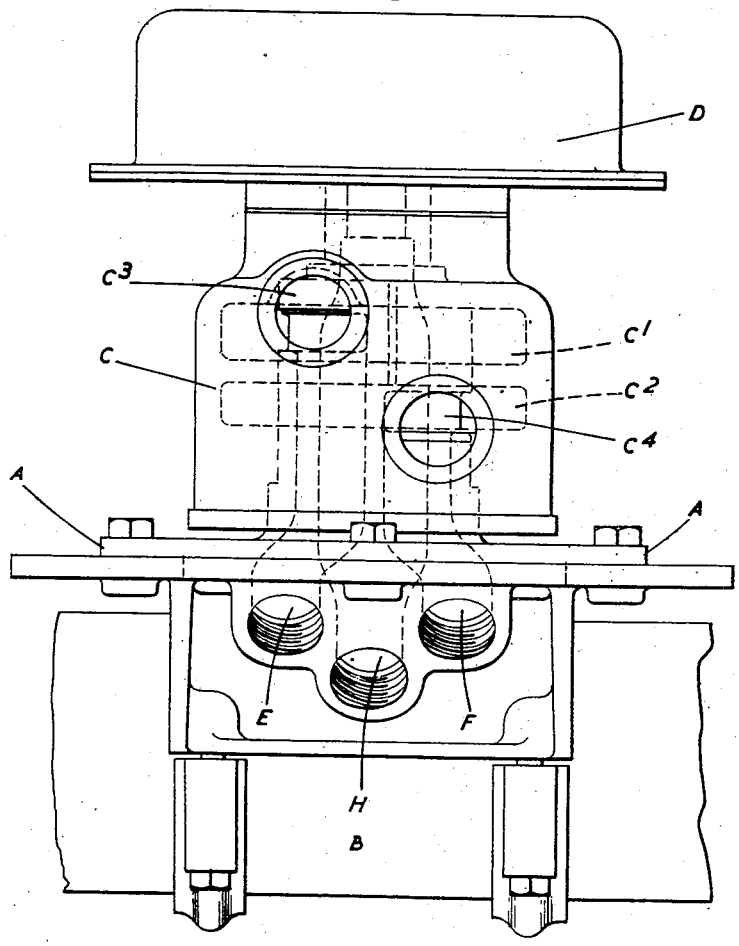
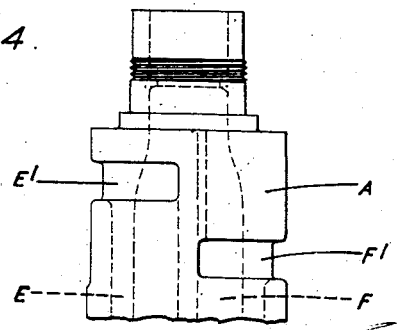
Inventors
F. B. LEVETUS
By J. W. WILSON
Attorneys Patented Mar. 13, 1945

2,371,528

UNITED STATES PATENT OFFICE 2,371,528

PRESSURE FLUID CONNECTION BETWEEN RELATIVELY ROTARY PARTS

Francis Benjamin Levetus and James Watt Wilson, Allesley, Coventry, England, assignors to The Keelavite Company Limited, Allesley, Coventry, England, a company of Great Britain Application September 13, 1943, Serial No. 502,216
In Great Britain September 29, 1942

5 Claims. (Cl. 285—97.3)

This invention relates to pressure fluid connections between fixed and rotary parts, for example junction boxes for the supply and return of fluids for driving a rotating mechanism such as the turntable of a crane or a gun turret. The object of the invention is to provide a form of connection which is of simpler and more efficient construction than those at present in use.

According to this invention a connection for fluid under pressure between relatively rotating parts comprises a pivotal member and a relatively rotatable member surrounding the pivotal member, separate passages for the supply and return of fluid being formed in the pivotal member and annular conduits in the surrounding member, the passages communicating with the conduits by means of laterally extending ports.

The passages extend in an axial direction in the pivotal member and are not concentric, in a preferred construction a third passage being also provided to accommodate electrical conductors by which current is supplied to slip rings carried by the pivotal and outer members.

A chamber to accommodate a ball bearing and a packing is formed between the pivotal and outer members above and below the annular conduits which thus lie between these packings, and to prevent pressure on the packing adjacent to the pressure port, a small conduit connects the chamber in which this packing is housed to the passage for the return fluid.

The ports through which the pressure and return passages communicate with their respective annular conduits are preferably sector-shaped in plan, and the electrical conductors may be housed in a passage of similar cross-section. At their opposite ends all the passages may terminate in screwthreaded sockets to receive conduits of circular cross-section, and similar sockets may be provided in the outer member for the pipes through which the operating fluid is distributed and returned.

One construction according to this invention is illustrated by way of example in the accompanying drawings, in which Figure 1 is a vertical sectional elevation on the line I—I of Figure 2, Figure 2 is a cross-section on the line II—II of Figure 1, Figure 3 is a side elevation at right angles to Figure 1, and Figure 4 shows in elevation the upper end of the pivotal member.

The fixed or non-rotating part of the connection comprises a pivotal member A which is shown as supported upon a transverse tubular member B. An outer member C is mounted to rotate about the pivotal member and the upper end of this carries a closed chamber D containing electrical connections.

The pivotal member has two axially extending passages E and F for the supply and return of fluid under pressure, the upper ends of which terminate in ports $E^1$, $F^1$, which respectively communicate with annular pressure and return conduits $C^1$, $C^2$ in the rotary member.

The lower ends of the passages E and F are provided with screwthreaded pipe sockets and similar sockets $C^3$, $C^4$ communicate with the upper and lower conduits $C^1$, $C^2$. The ports $E^1$, $F^1$ are of sector shape as shown in Figure 2 and a third passage H is provided for electrical conductors $H^1$ which are connected to slip rings $H^2$ on the fixed member and thus make contact with similar rings $D^1$ enclosed in the cap which rotates with the outer member C.

Mounted in an annular space between the pivotal member A and the return conduit $C^2$ is a ball bearing J and a packing ring $J^1$, and a similar bearing K and packing ring $K^1$ is provided at the upper end. To prevent fluid which may leak into the upper packing subjecting it to undue pressure a return conduit L connects the packing chamber to the return passage F.

The above construction enables the pipes for the operating fluid and the conduit containing the electrical conductors to be arranged compactly and to be easily connected or detached whilst permitting high pressures to be used without leakage or undue wear.

It will be understood that the pivotal member may if desired partake in the rotary movement of the mechanism and thus turn within a stationary outer member without departing from the invention, and that the eelctrical connections are only shown in a diagrammatic manner.

What we claim as our invention and desire to secure by Letters Patent is:

1. A connection for fluid under pressure between relatively rotating parts comprising a pivotal member, separate flow and return passages in said pivotal member, a surrounding member, annular conduits in said member, laterally extending ports connecting the passages and conduits, a packing chamber between the pivotal and outer members between each annular conduit and the adjacent end of the outer member, and a relief conduit within the pivot connecting the packing chamber on the pressure side to the passage for the return fluid.

2. A connection for fluid under pressure as claimed in claim 1 in which there are three passages, one of which serves to house an electric cable whilst the others constitute the flow and return passages, each conduit being of sector shape in cross-section.

3. A connection for fluid under pressure between relatively rotating parts as claimed in claim 1, in which a packing chamber in the pivotal member adjacent to the pressure port is connected by a separate conduit to the return passage.

4. A connection for fluid under pressure between relatively rotating parts as claimed in claim 1, in which an additional axially extending conduit is provided in the pivot member for electrical conductors and slip rings by which electrical connection is established between the outer and pivotal member.

5. A connection for fluid under pressure between relatively rotating parts as claimed in claim 1, in which the pivotal member is provided with three passages of similar sector cross-section to accommodate the electrical conductors and for the supply and return of the operating fluid.

FRANCIS BENJAMIN LEVETUS.
JAMES WATT WILSON.